US012665907B2

(12) United States Patent
Nagaraja et al.

(10) Patent No.: US 12,665,907 B2
(45) Date of Patent: Jun. 23, 2026

(54) MULTI-LEVEL AUTHENTICATION FOR ACCESSING CLOUD RESOURCES

(71) Applicant: Oracle International Corporation, Redwood Shores, CA (US)

(72) Inventors: Girish Nagaraja, Seattle, WA (US); Vineet Sarda, Seattle, WA (US); Choon Chea Chua, Seattle, WA (US); Prashanth Adhikari, Bellevue, WA (US); Ankush Gupta, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 18/775,955

(22) Filed: Jul. 17, 2024

(65) Prior Publication Data

US 2026/0025385 A1     Jan. 22, 2026

(51) Int. Cl.
*H04L 9/40*          (2022.01)
(52) U.S. Cl.
CPC ............ *H04L 63/105* (2013.01); *H04L 63/08* (2013.01)
(58) Field of Classification Search
CPC ..... H04L 63/105; H04L 63/08; H04L 63/083; H04L 63/0884; H04L 63/0815; G06F 21/40
See application file for complete search history.

(56) References Cited

U.S. PATENT DOCUMENTS

| | | | | |
|---|---|---|---|---|
| 8,145,909 | B1* | 3/2012 | Agrawal | H04L 9/3247 |
| | | | | 713/180 |
| 9,372,972 | B2* | 6/2016 | Coxe | H04L 63/06 |
| 9,419,841 | B1* | 8/2016 | Kozolchyk | H04L 9/3213 |
| 9,781,122 | B1* | 10/2017 | Wilson | H04L 63/08 |
| 10,305,962 | B1* | 5/2019 | Skowronski | H04L 67/535 |
| 10,454,921 | B1* | 10/2019 | Chen | H04L 63/0428 |
| 10,554,643 | B2* | 2/2020 | Venkataramana | H04L 63/08 |
| 10,951,606 | B1* | 3/2021 | Shahidzadeh | H04L 63/107 |

(Continued)

OTHER PUBLICATIONS

International Search Report and Written Opinion for PCT Application No. PCT/US2025/027941, dated Aug. 8, 2025.

(Continued)

*Primary Examiner* — Aravind K Moorthy
(74) *Attorney, Agent, or Firm* — Mughal Gaudry & Franklin PC

(57)          ABSTRACT

Techniques for a multi-level authentication within a cloud environment are disclosed. A first authentication request is received by an identity and access management (IAM) service from a device associated with a user. The first request is to authenticate the user for accessing one or more cloud resources through a gateway of the cloud environment. Responsive to the first authentication request, a redirection is performed to submit a second authentication request to an identity provider (IdP) to authenticate the user. A first token indicating a first identity for the user based on the first authentical is received by the IAM service, here the first authentication was performed by the IdP. The IAM service performs a second authentication of the user. The IAM service issues a second token indicating a second identity for the user. The device gains access to the one or more cloud resources, based on the second token.

20 Claims, 8 Drawing Sheets

100

User 140

(56) References Cited

U.S. PATENT DOCUMENTS

| | | | |
|---|---|---|---|
| 10,965,674 B1 * | 3/2021 | Zigman | G06F 21/78 |
| 11,121,863 B1 * | 9/2021 | O'Neill | H04L 9/3247 |
| 11,206,269 B1 * | 12/2021 | Van Deman | G06F 21/45 |
| 11,297,040 B2 * | 4/2022 | Bonci | H04L 63/1441 |
| 11,336,453 B2 * | 5/2022 | Jamkhedkar | H04L 9/3297 |
| 11,363,024 B2 * | 6/2022 | Owen | H04L 63/0884 |
| 11,463,309 B1 * | 10/2022 | Eberlein | H04L 41/0806 |
| 12,040,977 B1 * | 7/2024 | Rao | H04L 45/76 |
| 12,177,185 B1 * | 12/2024 | Ryland | H04L 63/102 |
| 12,407,730 B2 * | 9/2025 | Ben-Noon | H04L 63/20 |
| 12,512,092 B1 * | 12/2025 | Tu | G10L 15/08 |
| 12,526,161 B2 * | 1/2026 | Tadepalli | H04L 9/3265 |
| 12,536,336 B2 * | 1/2026 | Luthra | G06F 21/629 |
| 2006/0259438 A1 * | 11/2006 | Randle | H04L 63/20 |
| | | | 705/65 |
| 2007/0245411 A1 * | 10/2007 | Newton | H04L 63/0884 |
| | | | 726/8 |
| 2011/0030047 A1 * | 2/2011 | Gao | H04W 12/068 |
| | | | 726/28 |
| 2012/0303835 A1 * | 11/2012 | Kempf | H04L 41/0695 |
| | | | 709/235 |
| 2013/0086639 A1 * | 4/2013 | Sondhi | H04W 12/068 |
| | | | 726/4 |
| 2014/0189840 A1 * | 7/2014 | Metke | H04L 63/0815 |
| | | | 726/9 |
| 2015/0052584 A1 * | 2/2015 | Rudraraju | H04L 63/102 |
| | | | 726/4 |
| 2016/0087957 A1 | 3/2016 | Shah et al. | |
| 2017/0026374 A1 | 1/2017 | Oberheide et al. | |
| 2017/0099280 A1 * | 4/2017 | Goel | H04L 67/146 |
| 2017/0331813 A1 * | 11/2017 | Lander | H04L 63/0815 |
| 2018/0041491 A1 * | 2/2018 | Gupta | G06F 9/547 |
| 2018/0077138 A1 * | 3/2018 | Bansal | G06Q 20/325 |
| 2018/0131686 A1 | 5/2018 | Brannon | |
| 2018/0159687 A1 * | 6/2018 | Yim | H04L 63/0815 |
| 2018/0191703 A1 * | 7/2018 | Nam | H04L 65/1016 |
| 2018/0196960 A1 * | 7/2018 | Gullicksen | H04L 63/107 |
| 2018/0255040 A1 * | 9/2018 | Chennuri | H04L 63/102 |
| 2018/0295135 A1 * | 10/2018 | Feijoo | H04L 63/10 |
| 2018/0322183 A1 * | 11/2018 | Feijoo | G06F 16/13 |
| 2018/0337907 A1 * | 11/2018 | Bhansali | H04L 9/3231 |
| 2018/0373862 A1 * | 12/2018 | Feijoo | H04L 63/205 |
| 2019/0095310 A1 * | 3/2019 | Liran | H04L 63/1408 |
| 2019/0392017 A1 * | 12/2019 | Carru | H04L 67/02 |
| 2020/0007541 A1 * | 1/2020 | Appiah | H04L 61/3015 |
| 2020/0084036 A1 * | 3/2020 | Rowe | H04L 9/3213 |
| 2020/0099675 A1 * | 3/2020 | Mardiks Rappaport | |
| | | | H04L 63/1466 |
| 2020/0099685 A1 * | 3/2020 | Wijaya | H04L 63/0884 |
| 2020/0137042 A1 * | 4/2020 | Kannan, III | H04L 63/083 |
| 2020/0211098 A1 * | 7/2020 | Miyamoto | H04L 9/3213 |
| 2020/0322342 A1 * | 10/2020 | Gokhale | H04L 63/108 |
| 2021/0067961 A1 * | 3/2021 | Dhammawat | H04W 12/041 |
| 2021/0081252 A1 * | 3/2021 | Bhargava | G06F 9/5072 |
| 2021/0099297 A1 * | 4/2021 | Mane | H04L 9/3213 |
| 2021/0099450 A1 * | 4/2021 | Jain | H04L 63/0823 |
| 2021/0281559 A1 * | 9/2021 | Valecha | H04L 63/0853 |
| 2021/0297449 A1 * | 9/2021 | Pasion | H04L 9/3247 |
| 2021/0342196 A1 * | 11/2021 | Natarajan | H04L 41/0806 |
| 2021/0392151 A1 * | 12/2021 | Lakhani | H04L 63/20 |
| 2021/0409219 A1 * | 12/2021 | Elmenshawy | H04L 9/3228 |
| 2022/0014421 A1 | 1/2022 | Medam et al. | |
| 2022/0038449 A1 * | 2/2022 | Tripp | H04L 67/02 |
| 2022/0166763 A1 * | 5/2022 | Hong | H04L 67/10 |
| 2022/0210145 A1 * | 6/2022 | Wrenbeck | H04L 63/0884 |
| 2022/0232003 A1 * | 7/2022 | Smolny | H04L 63/0807 |
| 2022/0294788 A1 * | 9/2022 | Pattar | H04L 63/10 |
| 2022/0329584 A1 * | 10/2022 | Sharma | H04L 9/3263 |
| 2023/0027672 A1 * | 1/2023 | Khan | H04W 76/38 |
| 2023/0053907 A1 * | 2/2023 | Chan | H04L 63/105 |
| 2023/0097763 A1 * | 3/2023 | Pandiri | G06F 9/5072 |
| | | | 718/1 |
| 2023/0098641 A1 * | 3/2023 | Sharma | H04L 63/0815 |
| | | | 726/8 |
| 2023/0100200 A1 * | 3/2023 | Evani | H04L 9/3213 |
| | | | 713/185 |
| 2023/0103886 A1 * | 4/2023 | Sharma | H04L 9/3213 |
| | | | 726/8 |
| 2023/0188515 A1 * | 6/2023 | Liang | H04L 63/0815 |
| | | | 713/168 |
| 2023/0247087 A1 * | 8/2023 | Nagaraja | H04L 67/10 |
| | | | 709/201 |
| 2023/0275893 A1 * | 8/2023 | Sharma | H04L 63/0807 |
| | | | 726/9 |
| 2024/0012933 A1 * | 1/2024 | Widmer | H04L 9/0894 |
| 2024/0054209 A1 * | 2/2024 | Simakov | G06F 21/46 |
| 2024/0054481 A1 * | 2/2024 | Nagao | G06Q 20/1235 |
| 2024/0078295 A1 * | 3/2024 | Philippe | H04L 63/102 |
| 2024/0080277 A1 * | 3/2024 | Lee | H04L 67/60 |
| 2024/0098115 A1 * | 3/2024 | Dürr | H04L 67/1006 |
| 2024/0114019 A1 * | 4/2024 | Olden | H04L 63/083 |
| 2024/0126848 A1 * | 4/2024 | Ead | H04L 45/76 |
| 2024/0195877 A1 * | 6/2024 | Xue | H04L 67/142 |
| 2024/0214366 A1 * | 6/2024 | Jeong | H04L 67/141 |
| 2024/0348589 A1 * | 10/2024 | Chen | H04L 63/08 |
| 2024/0364588 A1 * | 10/2024 | Shilmover | G06F 8/60 |
| 2024/0364690 A1 * | 10/2024 | Doherty | H04L 63/10 |
| 2024/0386098 A1 * | 11/2024 | Sawant | G06F 21/552 |
| 2024/0396884 A1 * | 11/2024 | Lin | H04L 63/0807 |
| 2025/0097163 A1 * | 3/2025 | Fang | G06F 9/5044 |
| 2025/0112906 A1 * | 4/2025 | Kwon | G06F 21/6218 |
| 2025/0247234 A1 * | 7/2025 | Garrepalli | H04L 9/3213 |
| 2025/0254174 A1 * | 8/2025 | Rui | H04L 63/102 |
| 2025/0322077 A1 * | 10/2025 | Panwar | H04L 43/06 |
| 2025/0323906 A1 * | 10/2025 | Panwar | H04L 9/006 |
| 2025/0350944 A1 * | 11/2025 | Choyi | H04W 12/069 |
| 2025/0358269 A1 * | 11/2025 | Gupta | H04L 9/3271 |
| 2025/0384061 A1 * | 12/2025 | Hanily | G06F 9/5022 |
| 2026/0010592 A1 * | 1/2026 | Whitaker | G06F 21/31 |

OTHER PUBLICATIONS

AWS, "AWS User Guide—AWS Identity and Access Management", Amazon Web Services, Inc., 2024.

AWS., "SAML 2.0 federation", AWS Identity and Access Management, https://docs.aws.amazon.com/IAM/latest/UserGuide/id_roles_provider, 10 pages.

* cited by examiner

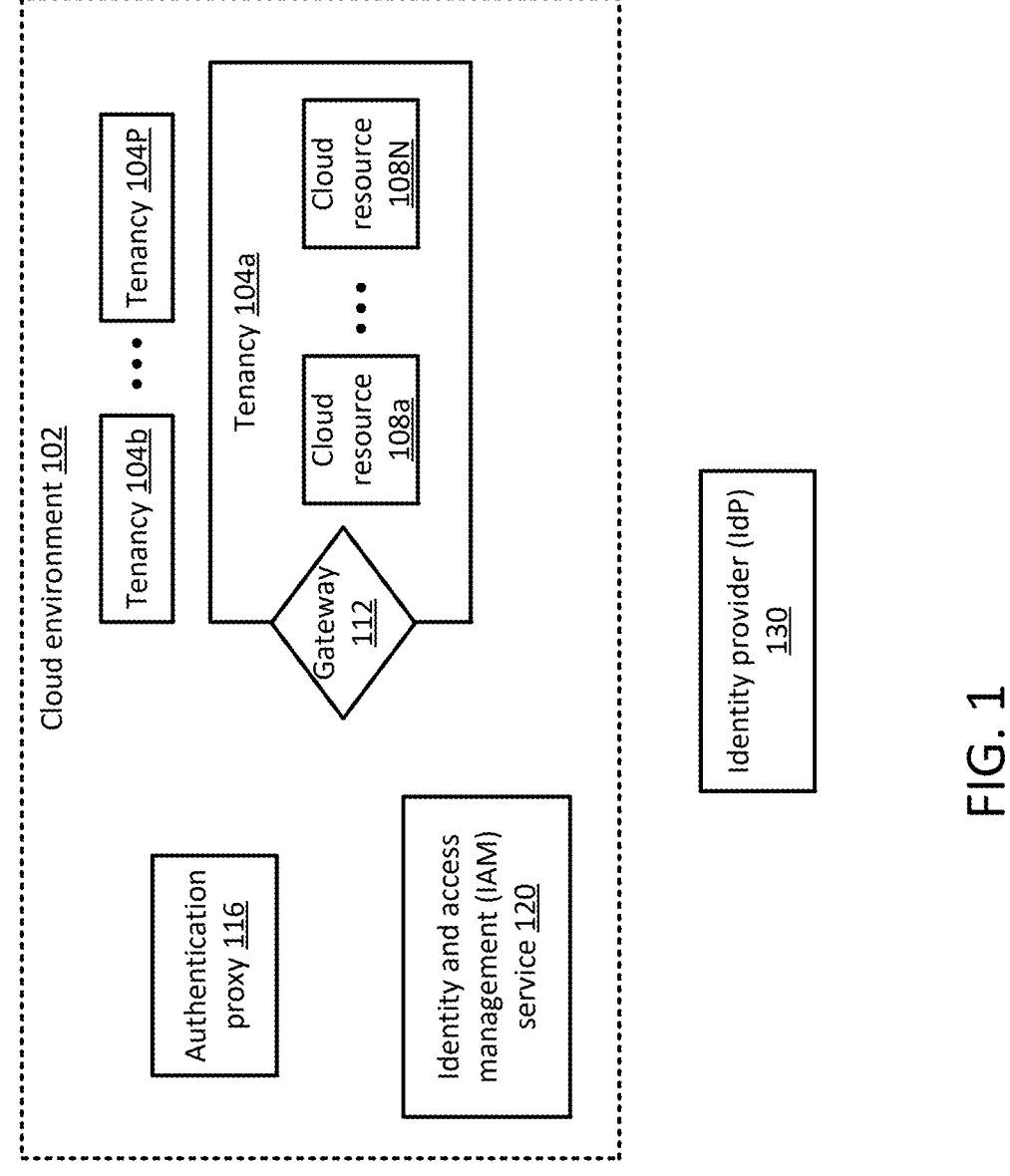
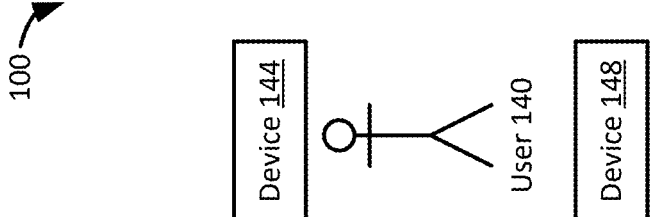
FIG. 1

Figure 3:
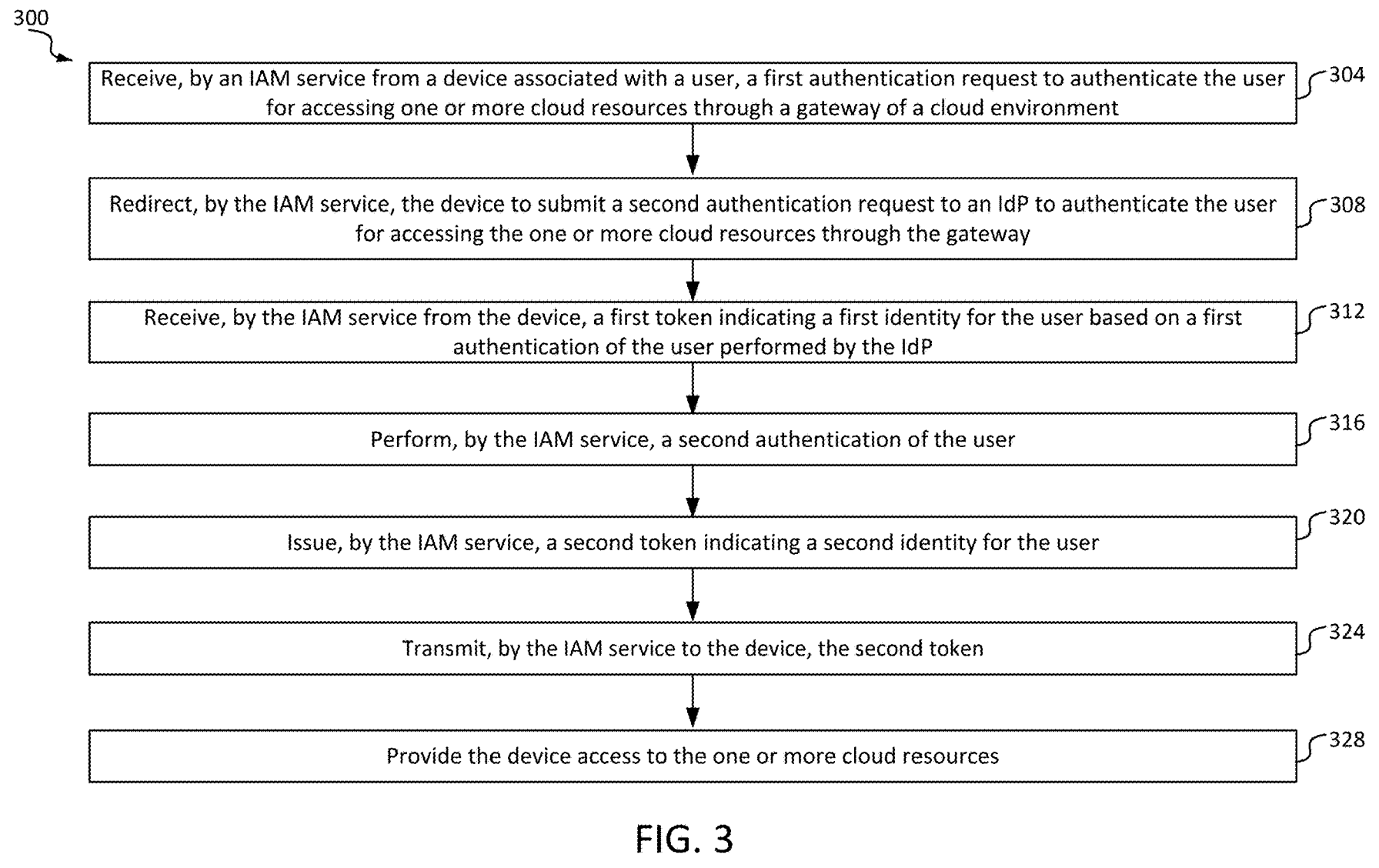

300

304
Receive, by an IAM service from a device associated with a user, a first authentication request to authenticate the user for accessing one or more cloud resources through a gateway of a cloud environment 308
Redirect, by the IAM service, the device to submit a second authentication request to an IdP to authenticate the user for accessing the one or more cloud resources through the gateway 312
Receive, by the IAM service from the device, a first token indicating a first identity for the user based on a first authentication of the user performed by the IdP 316
Perform, by the IAM service, a second authentication of the user 320
Issue, by the IAM service, a second token indicating a second identity for the user 324
Transmit, by the IAM service to the device, the second token 328
Provide the device access to the one or more cloud resources

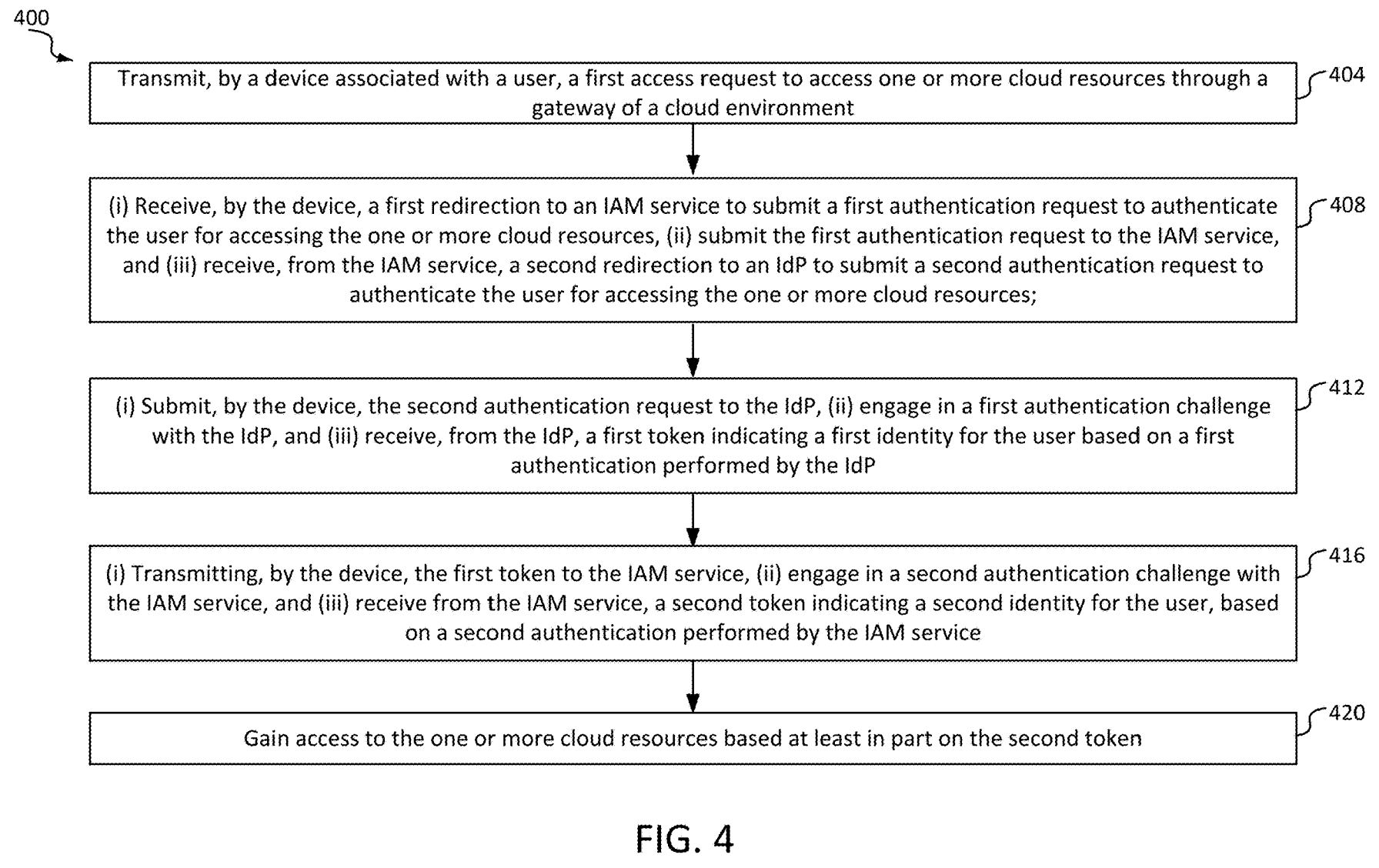

Transmit, by a device associated with a user, a first access request to access one or more cloud resources through a gateway of a cloud environment

408

(i) Receive, by the device, a first redirection to an IAM service to submit a first authentication request to authenticate the user for accessing the one or more cloud resources, (ii) submit the first authentication request to the IAM service, and (iii) receive, from the IAM service, a second redirection to an IdP to submit a second authentication request to authenticate the user for accessing the one or more cloud resources;

412

(i) Submit, by the device, the second authentication request to the IdP, (ii) engage in a first authentication challenge with the IdP, and (iii) receive, from the IdP, a first token indicating a first identity for the user based on a first authentication performed by the IdP

416

(i) Transmitting, by the device, the first token to the IAM service, (ii) engage in a second authentication challenge with the IAM service, and (iii) receive from the IAM service, a second token indicating a second identity for the user, based on a second authentication performed by the IAM service

420

Gain access to the one or more cloud resources based at least in part on the second token

FIG. 4

MULTI-LEVEL AUTHENTICATION FOR ACCESSING CLOUD RESOURCES

BACKGROUND

A cloud provider provides on-demand, scalable computing resources (e.g., a cloud environment) to its cloud customers. A cloud customer generally desires to run its cloud resources without monitoring, scanning, or other interference by the cloud provider or other cloud customer. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances. Access to cloud resources within a tenancy is restricted to authorized users of the tenancy.

BRIEF SUMMARY

In some embodiments, a computer-implemented method includes receiving, by an identity and access management (IAM) service from a device associated with a user, a first authentication request to authenticate the user for accessing one or more cloud resources through a gateway of a cloud environment; responsive at least in part to receiving the first authentication request, redirecting, by the IAM service, the device to submit a second authentication request to an identity provider (IdP) to authenticate the user for accessing the one or more cloud resources through the gateway; receiving, by the IAM service from the device, a first token indicating a first identity for the user based on a first authentication of the user performed by the IdP; performing, by the IAM service, a second authentication of the user; responsive at least in part to receiving the first token and performing the second authentication of the user, issuing, by the IAM service, a second token indicating a second identity for the user; and transmitting, by the IAM service to the device, the second token. In an example, the device gains access to the one or more cloud resources, based at least in part on the second token.

In an example, the method further includes prior to receiving the first authentication request: receiving, by an authentication proxy from the device, an access request to access the one or more cloud resources through the gateway; and redirecting, by the authentication proxy, the device to submit the first authentication request to the IAM service. In an example, the device transmits the first token to the IAM service responsive to being redirected by the IAM service to submit the second authentication request to the IdP. In an example, the IdP issues the first token responsive to the second authentication request and transmits the first token to the device. In an example, the first token is issued responsive to the second authentication request and the second token is issued responsive to the first authentication request. In an example, the method further includes determining authorization information associated with the user, based at least in part on the second token, the authorization information identifying the one or more cloud resources that the user has permission to access; and providing the device access to the one or more cloud resources, based at least in part on the authorization information.

In an example, the first authentication comprises a first authentication challenge issued to the user by the IdP, and the second authentication comprises a second authentication challenge issued to the user by the IAM service. In an example, the first authentication challenge comprises receiving, from the device, a password; and the second authentication challenge comprises receiving, from the device, a code. In an example, the code was issued by the IAM service to the user via the device or another device associated with the user. In an example, the first authentication challenge comprises receiving, from the device, a password, wherein and the second authentication challenge comprises receiving, from another device associated with the user, a confirmation that the user requests to be authenticated.

In an example, the IAM service executes from within the cloud environment, and the IdP executes from outside the cloud environment. In an example, the one or more cloud resources are within a tenancy rented to a cloud customer; the IdP is provided by the cloud customer, or by an entity authorized or engaged by the cloud customer; and the IAM service is provided by a provider of the cloud environment. In an example, the user has been provisioned to the IdP; and the IAM service receives, from the IdP, one or more of a user identification (ID) of the user, information about an authenticator application accessible to the user, an email associated with the user, a phone number associated with the user, and a security question and answer pair pre-selected by the user. In an example, each of the first and second first authentication requests is a Security Assertion Markup Language (SAML) request including an Extensible Markup Language (XML) document comprising one or more credentials of the user. In an example, the first authentication request is received from a web browser or a mobile application being executed on the device. In an example, the first identity indicated by the first token and the second identity indicated by the second token are for the same user.

In some embodiments, another computer-implemented method includes transmitting, by a device associated with a user, a first access request to access one or more cloud resources through a gateway of a cloud environment; receiving, by the device, a first redirection to an identity and access management (IAM) service to submit a first authentication request to authenticate the user for accessing the one or more cloud resources; submitting the first authentication request to the IAM service; receiving, by the device from the IAM service, a second redirection to an identity provider (IdP) to submit a second authentication request to authenticate the user for accessing the one or more cloud resources; submitting, by the device, the second authentication request to the IdP; receiving, by the device from the IdP, a first token indicating a first identity for the user based on a first authentication performed by the IdP; transmitting, by the device, the first token to the IAM service; receiving, by the device from the IAM service, a second token indicating a second identity for the user, based on a second authentication performed by the IAM service; and gaining access to the one or more cloud resources based at least in part on the second token. In an example, the first authentication comprises a first authentication challenge issued to the user by the IdP, and the second authentication comprises a second authentication challenge issued to the user by the IAM service.

In some embodiments, a non-transitory computer-readable medium includes instructions that when executed by one or more processors, cause a computing system that includes the one or more processors to perform operations including: receiving, by an identity and access management (IAM) service from a device associated with a user, a first authentication request to authenticate the user for accessing one or more cloud resources through a gateway of a cloud environment; responsive at least in part to receiving the first authentication request, redirecting, by the IAM service, the device to submit a second authentication request to an identity provider (IdP) to authenticate the user for accessing the one or more cloud resources through the gateway; receiving, by the IAM service from the device, a first token indicating a first identity for the user based on a first authentication of the user performed by the IdP; performing, by the IAM service, a second authentication of the user; responsive at least in part to receiving the first token and performing the second authentication of the user, issuing, by the IAM service, a second token indicating a second identity for the user; and transmitting, by the IAM service to the device, the second token. In an example, the device gains access to the one or more cloud resources, based at least in part on the second token.

In some embodiments, a system for a multi-level authentication within a cloud environment includes one or more processors; and one or more non-transitory computer-readable media storing instructions, which, when executed by the system, cause the system to perform a set of actions including: receiving, by an identity and access management (IAM) service from a device associated with a user, a first authentication request to authenticate the user for accessing one or more cloud resources through a gateway of a cloud environment; responsive at least in part to receiving the first authentication request, redirecting, by the IAM service, the device to submit a second authentication request to an identity provider (IdP) to authenticate the user for accessing the one or more cloud resources through the gateway; receiving, by the IAM service from the device, a first token indicating a first identity for the user based on a first authentication of the user performed by the IdP; performing, by the IAM service, a second authentication of the user; responsive at least in part to receiving the first token and performing the second authentication of the user, issuing, by the IAM service, a second token indicating a second identity for the user; and transmitting, by the IAM service to the device, the second token. In an example, the device gains access to the one or more cloud resources, based at least in part on the second token.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

The techniques described above and below may be implemented in a number of ways and in a number of contexts. Several example implementations and contexts are provided with reference to the following figures, as described below in more detail. However, the following implementations and contexts are but a few of many.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1 illustrates a block diagram of a system including a cloud environment, where access to cloud resources within a tenancy of the cloud environment is based on a multi-level authentication process.

FIG. 3 is a flow diagram depicting a method for a multi-level authentication process.

FIG. 4 is a flow diagram depicting a method by which a device of a user is authenticated using a multi-level authentication process.

DETAILED DESCRIPTION

Figure 2A:
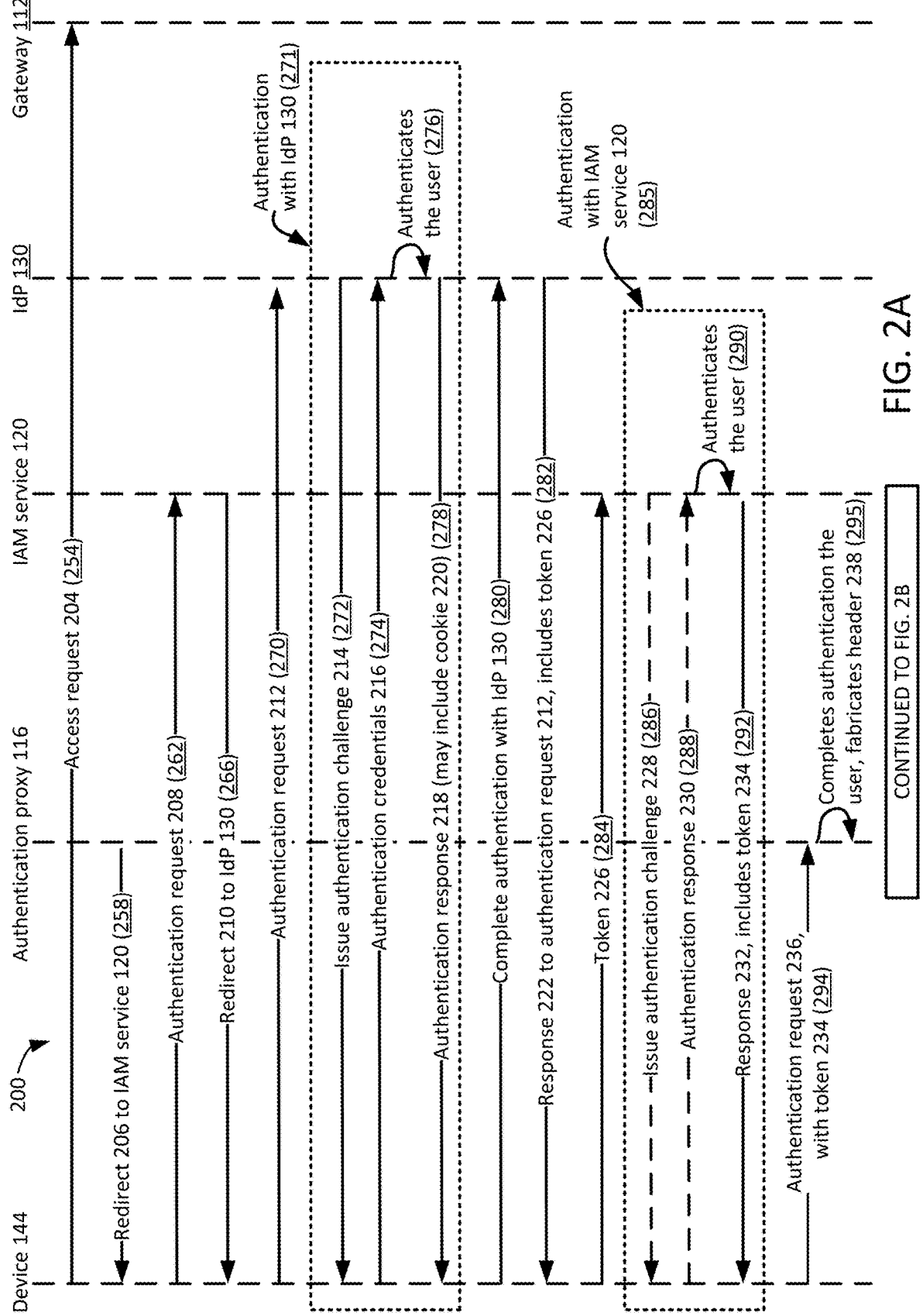
FIGS. 2A and 2B, in combination, illustrate a flow diagram depicting a multi-level authentication process.

Maintaining security of a cloud environment involves controlling access to cloud resources based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer.

A tenancy of a cloud customer includes a plurality of active cloud resources, such as compute instances that are used to host virtual machines. Other example cloud resources are also described below.

A user outside the cloud environment can access cloud resources within a tenancy of the cloud environment, e.g., after undergoing through an authentication and authorization process. In one example, generally during a user authentication process, a device of a user, such as a web browser (or a mobile application) being executed within the device, initially requests access to resources within a tenancy and behind a gateway. The web browser is redirected to an identity and access management (IAM) service configured to perform authentication and authorization for access to the gateway and other cloud resources behind the gateway. An identity provider (IdP) refers a component that performs authentication as well as identity lifecycle management. In an example, the IdP is within the IAM service. The cloud customer has administrative rights to create and manage users and groups within the IdP. Thus, the IdP has a list and credentials of users authorized to access the cloud resources of the customer. The IdP receives user credentials from the user and authenticates the user. In one example, the IdP implements a multi-factor authentication (MFA) during the authentication process, although in another example user identification (Id)/password verification (without a need of an MFA) may be sufficient. Upon verification of user credentials (either though single-factor authentication or using MFA), the IdP issues an authentication token to the user web browser. Now, the user authorization process can begin. The web browser can submit the authentication token to the gateway. IAM intercepts to perform authorization for the access to the gateway based on the authentication token. IAM recognizes this authentication token since it was issued by its own IdP. Therefore, the web browser gains access to resources behind the gateway using the authentication token issued by the IdP. Thus, in this authentication process flow, a single IdP (which may be included within or be a part of the IAM) is responsible for user authentication. Because a single IdP is involved in authentication of the user, such authentication is also referred to herein as a "single level authentication process."

In another example, the IdP may be federated. Rather than an IdP of the IAM performing the authentication, a third-party IdP may generally perform authentication (authorization is still performed by the cloud provider IAM). The IdP is a "third-party" IdP as it is not associated with or is a part of the IAM. In an example, the third-party IdP may operate outside the cloud environment. Additionally or alternatively, the third-party IdP may be operated by an entity other than the cloud service provider, while the IAM is operated by the cloud service provider. During set up, the cloud customer, renting the cloud resources behind the gateway, selects the third-party IdP and establishes trust between the third-party IdP and the cloud provider IAM. During the user authentication process, a device of the user, such as a web browser (or a mobile application) being executed within the device initially requests access to cloud resources behind the gateway. The web browser is redirected to the third-party IdP. The IdP receives user credentials from the user and authenticates the user. Upon verification of user credentials (either through single-factor authentication or using MFA), the IdP issues an authentication token to the user web browser. However, this third-party authentication token may not be directly recognized by IAM during authorization. Therefore, the web browser sends the third-party authentication token to IAM. IAM verifies the third-party authentication token based on its trusted relationship with the third-party IdP. Upon verification, IAM sends back a (native) authentication token to the web browser. Note that the IAM does not perform any additional authentication of the user, and rather issues the (native) authentication token, based on the authentication token issued by the IdP. Now, the user authorization process can begin. The web browser can submit the (native) authentication token to the gateway. IAM intercepts to perform authorization for the access to the gateway based on the (native) authentication token. IAM recognizes this (native) authentication token since it was issued by its own IdP. Therefore, the web browser gains access to resources behind the gateway using the (native) authentication token issued by the IAM. Thus, in this authentication process flow, a single IdP (the third-party IdP) is responsible for user authentication. Because the single IdP is involved in authentication of the user, such authentication is also referred to as a "single level authentication process."

In the context of software assurance, in an example, an additional role of an assurance administrator is added into the picture. The assurance administrator may or may not be the same as the cloud provider. In an example, the assurance administrator acts as a "trusted technology provider" (TTP). With regard to the subject disclosure, the assurance administrator needs to have a role or control over users receiving access to the cloud resources of a cloud customer. Thus, it may be desired that the assurance administrator is somehow involved and has some degree of control (e.g., in addition to the IdP) in the authentication process.

If the cloud customer uses the IdP within the assurance administrator's IAM, then the assurance administrator can have control and visibility into the authentication processes. However, in an example, the cloud customer may prefer not to use the IdP within the assurance administrator's IAM. For example, there may not be enough trust between the cloud customer and the assurance administrator, and due to such factors, the cloud customer may not want to solely rely on the IAM of the assurance administrator or the cloud provider for user authentication.

Furthermore, the assurance administrator may desire to enforce an MFA requirement on authentication process. With a third-party IdP controlled by the cloud customer, the assurance administrator has no way to enforce the MFA requirement. In yet another example, the assurance administrator may desire that the exchange of user credentials during the authentication process satisfies a certain level of security. With a third-party IdP, the assurance administrator has no way to enforce what credentials are required, and how credentials are exchanged.

Thus, the cloud customer may desire to have control over user authentication, and the assurance administrator may also want to have control over user authentication. On one hand, if the cloud customer chooses to use a third-party IdP, then authentication would be performed by the third-party IdP, and IAM of the assurance administrator may not have significant monitoring and/or control in the authentication process. On the other hand, if the IAM of the assurance administrator performs the user authentication, the cloud customer may not have significant monitoring and/or control in the authentication process.

Accordingly, in an example and as described below in further detail, a "multi-level authentication process" is used to authenticate a user trying to access cloud resources behind a gateway of a cloud environment. For example, a third-party IdP is used to provide a first level of authentication of the user, where users are provisioned to the IdP by the cloud customer. An additional second level of authentication is performed by an IAM service provided by the assurance administrator. Note that the third-party IdP may be provided by (i) a party other than the cloud customer or the cloud provider, where the party has an agreement or trust with, or is under control of, the cloud customer, or (ii) by the cloud customer itself. In contrast, the IAM service is provided by the assurance administrator and/or the cloud service provider. Thus, both the assurance administrator and cloud customer have some degree of control on authentication of users. Because both the third-party IdP and the IAM service are authenticating the user, this authentication process is also referred to herein as the "multi-level authentication process."

For example, when the user device tries to access cloud resources of the tenancy through a gateway of the tenancy, an authentication proxy redirects the user device to the IAM service provided by the assurance administrator. The IAM service further redirects the user device to the third-party IdP. In an example, the IAM service is maintained by the assurance administrator (which may be the cloud provider) and may use cloud resources within the cloud environment. In contrast, in an example, the third-party IdP may be external to the cloud environment.

The third-party IdP initially performs a first level of authentication of the user, e.g., based on verification of first one or more user credentials (such as a user ID and password). The third-party IdP then issues a first authentication token to the user device.

Now the user device comes back to the IAM service, and provides the first authentication token to the IAM service. The IAM service performs a second level of authentication of the user, e.g., based on verification of second one or more user credentials (such as a one-time passcode, a confirmation within a pre-authenticated user device, using an authenticator, and/or the like, as described below in further detail). Once the second level of authentication of the user is complete, the IAM service issues a second authentication token.

Once the user device has the IAM service issued second authentication token, the user device can submit the second authentication token to the gateway, and an authorization process is initiated (e.g., by the IAM and/or an authentication proxy). Upon completion of the authorization process (which is described below in further detail), the user device has access to one or more cloud resources behind the gateway.

Thus, in a multi-level authentication process described herein, both the IdP and the IAM service perform respective authentication processes. Thus, the overall authentication process is by default an MFA process, as at least two authentication factors are being verified (e.g., at least one by the IdP, and at least another by the IAM service). In such a process, both the cloud customer (e.g., through the IdP) and the assurance administrator (e.g., through the IAM service) have control and monitoring role over the authentication process, and a user device has to undergo through both the levels of the authentication process, to access the cloud resources rented out to the cloud customer.

Multi-Level Authentication Process to Access Cloud Resources within a Cloud Environment FIG. 1 illustrates a block diagram of a system 100 including a cloud environment 102, where access to cloud resources 108a, . . . , 108N within a tenancy 104a of the cloud environment 102 is based on a multi-level authentication process.

The cloud environment 102 comprises a plurality of tenancies 104a, 104b, . . . , 104P. As described above, a tenancy is a conceptual bucket that holds cloud resources belonging to a particular cloud customer. A tenancy of a cloud customer is isolated from another tenancy of another cloud customer. A tenancy of a cloud customer includes a plurality of active cloud resources. For example, the tenancy 104a includes cloud resources 108a, . . . , 108N. Cloud resources of the other tenancies 104b, . . . , 104P are not illustrated in FIG. 1. Examples of cloud resources within a tenancy include compute instances (e.g., which are used to host virtual machines), networking resources (such as gateways, virtual routers, firewalls, bandwidth and network management software), compartments, software agents operating within computing instances, storage, software applications, and/or any other type(s) of cloud resources generally assigned to tenancies of a cloud environment.

Access to each tenancy 104 is through a corresponding gateway. For example, a user 140 may access the cloud resources 108a, . . . , 108N within the tenancy 104a using one or more devices 144, 148, and such access to the cloud resources 108a, . . . , 108N within the tenancy 104a may be through the gateway 112. Accessing cloud resources 108a, . . . , 108N within the tenancy 104a are described below in further detail, and access to cloud resources within the other tenancies 104b, . . . , 104P may similarly be performed.

In an example, the cloud environment 102 comprises an authentication proxy 116 that facilitates in an authentication process (e.g., facilitates in redirection of an authentication request), e.g., when a user (such as the user 140) is trying to access cloud resources within a tenancy, such as the cloud resources 108a, . . . , 108N within the tenancy 104a, as described below in further detail. In an example, the cloud environment 102 further comprises an IAM service 120 that also facilitates in an authentication and access management process, e.g., when a user (such as the user 140) is trying to access cloud resources within a tenancy, such as the cloud resources 108a, . . . , 108N within the tenancy 104a, as described below in further detail.

In an example, the tenancy 104a is rented out to a cloud customer. In an example, the cloud customer plays a role in authentication and/or authorization of user devices trying to access cloud resources 108a, . . . , 108N within the tenancy 104a. However, as also described above, in the context of software assurance, in an example, an additional role of an assurance administrator is added into the picture. The assurance administrator may or may not be the same as the cloud provider (e.g., provider of the cloud environment 102). In an example, the assurance administrator acts as a "trusted technology provider" (TTP). With regard to the system 100, the assurance administrator undertakes a role or control over users receiving access to the cloud resources 108a, . . . 108N of the cloud customer. Thus, it may be desired that the assurance administrator is somehow involved and has some degree of control in the authentication process of the users receiving the access to the cloud resources 108a, . . . , 108N of the cloud customer.

Accordingly, in an example, a multi-level authentication process is used to authenticate a user trying to access the cloud resources 108a, . . . , 108N within the tenancy 104a and behind the gateway 112 of the cloud environment 102. For example, a third-party IdP 130 is used to provide a first level of authentication of the user 140, where users are provisioned to the IdP 130 by the cloud customer. Note that services of the third-party IdP 130 may be provided by (i) a party other than the cloud customer or the cloud provider, where the party has an agreement with or is under control of the cloud customer, or (ii) by the cloud customer itself. The third-party IdP 130 is different from the provider of the cloud environment 102 and the assurance administrator. In contrast, the IAM service 120 is provided by the assurance administrator. In an example, the IdP 130 may operate outside the cloud environment 102, such as may not use resources of the cloud environment 102. The services of the IdP 130 may be provided by any appropriate IdP service provider, such as Google®, Okta®, Facebook®, Microsoft®, or the like. In another example, the services of the IdP 130 may be provided by the cloud customer that rents the tenancy 104a from the provider of the cloud environment 102.

As also described above, an additional second level of authentication is performed by the IAM service 120. In an example, the IAM service 120 is provided by the assurance administrator. In another example, the IAM service 120 is provided by an entity entrusted by, engaged by, and/or controlled by the assurance administrator. As described above, the assurance administrator may be the same as (or different from) the owner or the provider of the cloud environment 102 (referred to also as the cloud provider).

In one example, the IAM service 120 is provided using resources of the cloud environment 102, although in another example the IAM service 120 may be external to the cloud environment 102.

As will be described below in further detail, a user 140 is assumed to have one or more user devices 144, 148 (scenarios using two user devices 144, 148 are described below in further detail with respect to FIG. 2A). Assume that the user 140, using the device 144, is trying to access cloud resources 108a, . . . , 108N of the tenancy 104a through the gateway 112 of the tenancy 104a. In an example, the authentication proxy 116 redirects the user device 144 to the IAM service 120. The IAM service 120 further redirects the user device 144 to the IdP 130. The IdP 130 initially performs the first level of authentication of the user 140, e.g., based on verification of first one or more user credentials (such as a user ID and password). The IdP 130 then issues a first authentication token to the user device 144. Now the user device 144 comes back to the IAM service 120, and provides the first authentication token to the IAM service 120. The IAM service 120 performs a second level of authentication of the user (such as using a one-time passcode, a confirmation using a pre-authenticated user device 144 or 148, an authenticator app, and/or the like, as described below in further detail). Once the second level of authentication of the user 140 is complete, the IAM service 120 issues a second authentication token to the user device 144. Once the user device 144 has the second authentication token issued by the IAM service 120, the user device 144 can submit the second authentication token to the authentication proxy 116 and/or the gateway 112, and an authorization process is initiated. Upon completion of the authorization process (which is described below in further detail), the user device 144 has access to one or more cloud resources behind the gateway.

Thus, in this multi-level authentication process, both the IdP 130 and the IAM service 120 perform respective authentication processes. Hence, the overall authentication process is by default an MFA process, as at least two authentication factors are being verified (e.g., at least one by the IdP 130, and at least another by the IAM service 120). In such a process, both the cloud customer (e.g., through the IdP 130) and the assurance administrator (e.g., through the IAM service 120) have some degree of control and monitoring role over the authentication process, and a user device has to undergo through both the levels of the authentication process, to access the cloud resources rented out to the cloud customer. This satisfies a desire of the cloud customer to have control over users gaining access to cloud resources 108a, . . . , 108N of the tenancy 104a rented out to the clous customer, as well as a desire of the assurance administrator to perform software assurance service on the cloud customer, e.g., by having control over users trying to access cloud resources rented to the cloud customer.

Figure 2B:
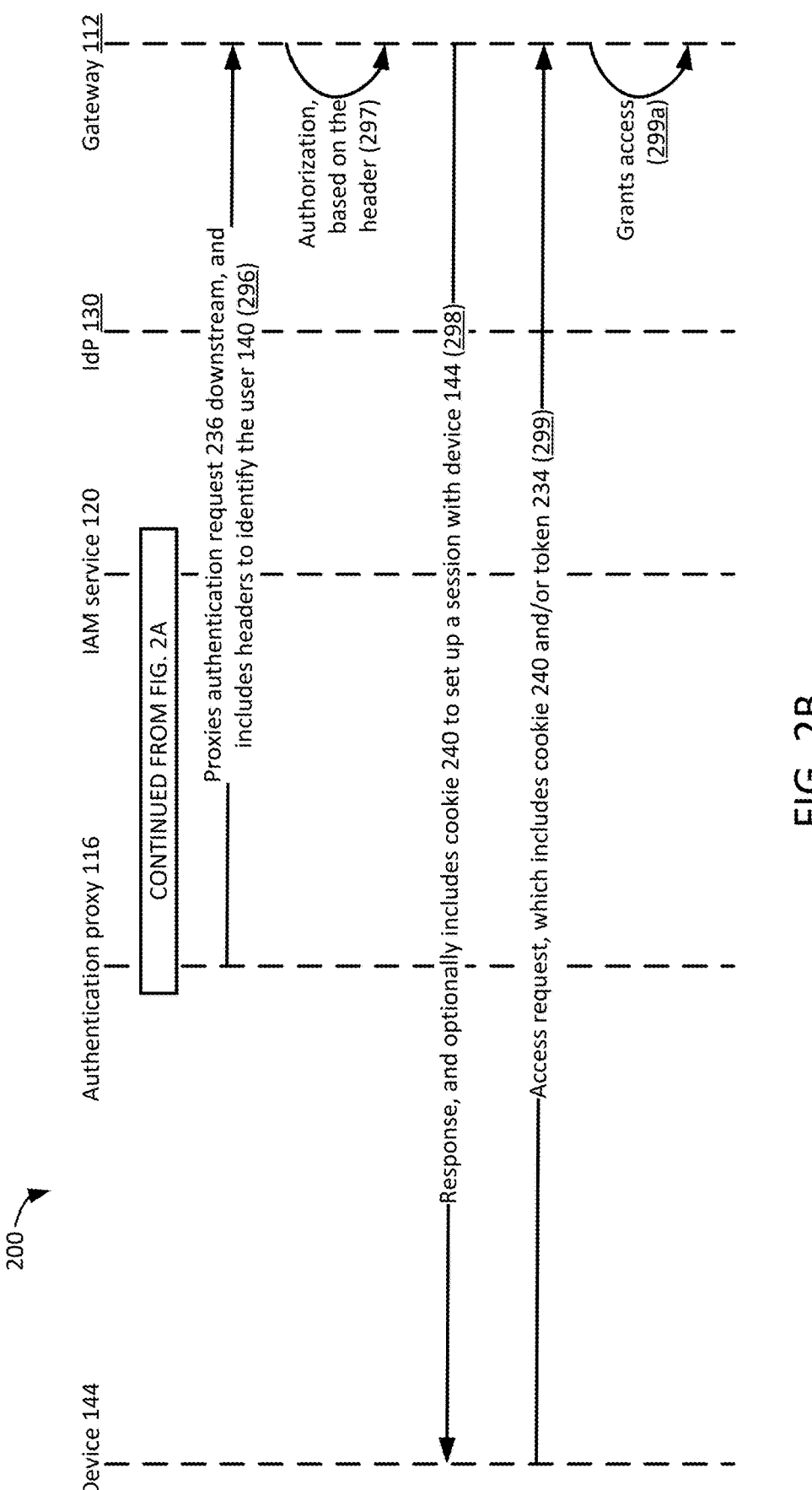

FIGS. 2A and 2B, in combination, illustrate a flow diagram 200 depicting a multi-level authentication process. The flow diagram 200 of FIGS. 2A and 2B is described with respect to the system 100 including the cloud environment 102 of FIG. 1. Unless otherwise mentioned to the contrary, in the below description with respect to FIGS. 2A and 2B, the device 144 performing an action may indicate that a web browser or an application being executed within the device 144 performs the action.

At 254 of the flow diagram 200, the device 144 of the user 140 transmits an access request 204 to the gateway 112, to access cloud resources 108a, . . . , 108N of the tenancy 104a behind the gateway 112. For example, the web browser or the application being executed within the device 144 transmits the access request 204. In an example, the access request 204 may not include or be accompanied by a session cookie or an authentication token. In an example, such access requests to the gateway 112 may be intercepted by the authentication proxy 116 that is associated with the gateway 112, and that is in front of the gateway 112. Accordingly, the authentication proxy 116 intercepts the access request 204 at 254.

At 258, the authentication proxy 116 performs a redirection 206, such as redirects the device 144 to the IAM service 120. For example, the authentication proxy 116 provides an address of the IAM service 120, and instructs the device 144 to transmit an authentication request to the IAM service 120.

At 262, the device 144 (e.g., the web browser or the application being executed within the device 144) transmits an authentication request 208 to the IAM service 120. In an example, the authentication request 208 may be in the form of a post SAML (Security Assertion Markup Language) request, such as a SAML 2.0 request. The authentication request 208 may be a first authentication request transmitted by the device 144, and hence, the authentication request 208 is also referred to as a SAMLRequest1. In an example, to transmit the authentication request 208 (such as a SAML request), the device 144 (e.g., the web browser or the application being executed within the device 144) may post a payload, which may be a SAML 2.0 assertion, to the IAM service 120. In an example, the payload may include an Extensible Markup Language (XML) document that includes information about the device 144 and/or the user 140 of the device 144.

At 266, the IAM service 120 performs a redirection 210, such as redirects the device 144 to the IdP 130. For example, the IAM service 120 provides an address of the IdP 130, and instructs the device 144 to transmit an authentication request to the IdP 130. Note that this is a second level of redirection. Thus, there is a first level of redirection 206 at 258 to the IAM service 120, and a second level of redirection 210 at 266 to the IdP 130.

At 270, the device 144 (e.g., the web browser or the application being executed within the device 144) transmits a second authentication request 212 to the IdP 130. In an example, the authentication request 212 may be in the form of a post SAML request, such as a SAML 2.0 request. The authentication request 212 may be a second authentication request transmitted by the device 144, and hence, the authentication request 212 is also referred to as a SAML- Request2. In an example, to transmit the authentication request 212 (such as a SAML request), the device 144 (e.g., the web browser or the application being executed within the device 144) may post a payload, which may be a SAML 2.0 assertion, to the IdP 130. In an example, the payload may include an XML document that includes information about the device 144 and/or the user 140 of the device 144.

The IdP 130 authenticates the user 140 at 271, which includes a plurality of subprocesses 272, . . . , 278 illustrated within a dotted box. For example, at 272 of 271, in response to the authentication request 212, the IdP 130 issues an authentication challenge 214 to the device 144. In an example, the authentication challenge 214 may requests credentials of the user 140. The credentials of the user 140 may include user identification (ID) and password of the user 140, for example, although other user credentials, such as an employee ID, the date of birth of the user, the social security number of the user, an email address of the user, a phone number of the user, a pre-selected answer to a pre-selected security question (e.g., pre-selected by the user), and/or the like, may also be used additionally or alternatively. For example, the cloud customer has supplied to the IdP 130 the user credentials for authenticating a plurality of users for accessing the cloud resources 108a, . . . , 108N. Assuming that the plurality of users includes the user 140, the user 140 has to provide such credentials to the IdP 130, in order to be authenticated by the IdP 130 and access the cloud resources 108a, . . . , 108N.

At 274, the device 144 transmits the requested credentials 216 of the user 140 to the IdP 130, e.g., based on the user 140 providing (such as inputting via an input/output component, such as a keyboard and/or a mouse) the requested credentials 216 to the device 144.

At 276, the IdP 130 authenticates the user 140. For example, the IdP 130 matches the credentials 216 received from the user 140 via the device 144 with a set of credentials of a plurality of authorized users who have authorization to access the cloud resources 108a, . . . , 108N.

Upon successful authentication of the user 140 at 276, the IdP 130 transmits at 278 an authentication response 218 to the device 144. In an example, the authentication response 218 may include request or instructions to set up a session with the provider of the IdP 130. For example, if the IdP 130 is provided by Google®, the authentication response 218 requests the device 144 to set up a Google® session.

In an example, the authentication response 218 includes a cookie 220, which may be used to set to the session with the provider of the IdP 130. In an example, upon successful completion of the flow diagram 200, the user 140 may remain authenticated by the IdP 130 and the IAM service 120 (and may access the cloud resources 108a, . . . , 108N) till the time the cookie 220 is valid. Upon expiration of the cookie 220 (e.g., upon closing the web browser within the device 144, or upon a pre-set time period from the issuance of the cookie 220), the user 140 may no longer remain authenticated and authorized to access the cloud resources 108a, . . . , 108N. However, in another example, the cookie 220 is for establishing the session with the provider of the IdP 130, and may not dictate a duration for which the user 140 remains authenticated and authorized to access the cloud resources 108a, . . . , 108N.

At 280, the device 144 transmits an acknowledgement to the IdP 130, e.g., acknowledging a completion of authentication with the IdP 130. In an example, the acknowledgement to the IdP 130 may indicate completion of the authentication request 212 of 270. In an example where the authentication request 212 of 270 is a SAMLRequest2, the acknowledgement to the IdP 130 may be an indication of a completion of the SAMLRequest2.

At 282, the IdP 130 transmits a response 222 to the authentication request 212 of 270. In an example where the authentication request 212 of 270 is the SAMLRequest2, the response 222 may be a SAML response to the SAMLRequest2. Thus, the response 222 is a SAML response. In an example, the response 222 of 282 includes a token 226. Thus, the token 226 is issued by the IdP 130, and transmitted by the IdP 130 to the device 144.

In an example, the token 226 indicates one or more credentials of the user 140. For example, the user 140 may have a user ID that the user 140 uses with the provider of the IdP 130, and the token 226 includes the user ID that the user 140 has with the provider of the IdP 130. Merely as an example where the IdP 130 is provided by Google®, the user ID is a Google® user ID of the user 140. In an example, the token 226 may also include one or more additional credentials of the user 140, such as a name of the user 140, a date of birth of the user 140, and/or the like.

At 284, the device 144 transmits the token 226 to the IAM service 120. For example, after being successfully authenticated by the IdP 130 and after receiving the token 226, the device 144 initiates an authentication process with the IAM service 120, by transmitting the token 226 to the IAM service 120. For example, the device 144 posts a SAML response to the IAM service 120 (e.g., in response to the authentication request 208 and the redirection 210), wherein the SAML response includes the token 226 received from the IdP 130.

The IAM service 120 authenticates the user 140 at 285, which includes a plurality of subprocesses 286, . . . , 292 illustrated within a dotted box. For example, at 286 of 285, in response to receiving the token 226 from the device 144, the IAM service 120 issues an authentication challenge 228. At 288, the IAM service 120 receives an authentication response 230.

Note that the lines for operations 286 and 288 are illustrated using dashed line, e.g., to signify that the authentication challenge 228 may be transmitted by the IAM service 120 to the device 144 or to another device 148 associated with the user 140, and similarly, the authentication response 230 may be received by the IAM service 120 from the device 144 or the device 148. Whether the authentication challenge 228 and the authentication response 230 are being communicated with the device 144 or 148 may be based on a type of challenge used for authentication.

Note that this authentication at 285 is a second level authentication (e.g., where the first level authentication was performed earlier by the IdP 130). Accordingly, the authentication at 285 is a second part of an MFA. The type of challenge used for authentication at 285 is implementation specific, and some examples of such an authentication is described below.

For example, the authentication at 285 may involve the IAM service 120 transmitting a one-time passcode (OTP) to a device of the user 140 (such as the device 144 or the device 148), where the device is pre-registered or pre-configured with the IAM service 120. In another example, the OPT may be sent to a phone of the user, or to an email address of the user. Thus, the device to which the OPT is transmitted can be the device 144 or the device 148, for example. In such an example, the IAM service 120 transmits a request to the device 144 to enter the OPT, which the user 140 may enter through an I/O component of the device 144. The authentication response 230 in such an example may include the OPT from the device 144 to the IAM service 120.

Additionally or alternatively, IAM service 120 may engage with the user 140, through the device 144, in a challenge-response scenario, where the user 140 has to verify additional details about the user, such as answering a pre-selected security questionnaire, or entering a credit card number, or entering another password, for example.

In another example, the authentication at 285 may involve the IAM service 120 transmitting a confirmation request to an authenticator operating within the device 144 or the device 148 (such as a device in which the authenticator is pre-installed). The user 140 may confirm, via the authenticator, the authentication confirmation request (e.g., confirm that the user requests to be authenticated). Example of such an authenticator is Oracle Mobile Authenticator (OMA)® provided by Oracle®. Other examples may use other forms of authenticator, such as using Fast Identity Online (FIDO)® authenticator, FIDO Passkeys®, or using another appropriate authenticator by which the IAM service 120 can authentication the user 140.

At 290, the IAM service 120 authenticates the user 140, e.g., based on one or more of the techniques described above. At 292, the IAM service 120 transmits an authentication response 232 which includes a token 234 issued by the IAM service 120. The authentication response 232 may be a SAML response to the authentication request 208 at 262. The token 234 may be in compliance with SAML 2.0 standard.

In an example, the token 234 may include a user ID of the user 140, as registered with the IAM service 120. Thus, when the user 140 registered with the cloud customer (to whom the tenancy 104a is rented out), the user 140 used a user ID (also referred to as a cloud user ID). The token 234 may include this cloud user ID of the user 140.

Note that the cloud user ID of the user 140, as included within the token 234 issued by the IAM service 120, may be same as, or different from, the user ID included within the token 226 issued by the IdP 130. For example, the token 226 included a user ID of the user 140, as registered with the provider of the IdP 130, whereas the token 234 includes the above-described cloud user ID. However, in any case, both the user IDs of the tokens 226 and 234 refer to the same user 140, and belong to the same user 140. Additionally (or alternatively), the token 234 may include one or more other credentials of the user 140, such as a name of the user, a zip code of the user 140, and/or the like.

At 294, the device 144 transmits an authentication request 236 to the authentication proxy 116, where the authentication request 236 is accompanied by the token 234 issued by the IAM service 120. In an example, the authentication request 236 may be a post SAML request to the gateway 112, which may be intercepted by the authentication proxy 116. In another example, the authentication request 236 may be a post SAML request to the authentication proxy 116.

In an example, the flow diagram 200 includes a plurality of SAML requests, e.g., a SAML request within another SAML request. For example, authentication requests at 262, 270, and/or 294 are SAML requests.

At 295, the authentication proxy 116 completes the authentication of the user 140. For example, the authentication proxy 116 validates the token 234, such as verify an authenticity of the token 234. In an example, the authentication proxy 116 may communicate with the IAM service 120 to validate the token, as the IAM service 120 issued the token 234 to the device 144. In another example, the authentication proxy 116 may have logic to validate the token 234, and verify its authenticity.

In an example, upon completion of the authentication (based on the token 234), the authentication proxy 116 fabricates a header 238, where the header 238 comprises information about the user 140 (such as the cloud user ID of the user 140), and/or a set of permissions or rules associated with the user 140. In an example, these information to be included in the header may be gathered from the token 234 and/or from the IAM service 120.

The flow diagram 200 continues from FIG. 2A to FIG. 2B. After process 295 illustrated in FIG. 2A, the flow diagram 200 includes process 296 illustrated in FIG. 2B. At 296, the authentication proxy 116 proxies the authentication request 236 downstream to the gateway 112. The authentication request 236, which is forwarded by the authentication proxy 116 to the gateway 112, includes the header 238 fabricated by the authentication proxy 116 at 295.

At 297, the gateway 112 performs an authorization of the device 144, e.g., to identify one or more cloud resources 108a, . . . , 108N and/or one or more cloud services offered by the tenancy 104a, which the user 140 is authorized to access. Such authorization of the user 140 may be based on the information included within the header 238. For example, the gateway 112 derives the cloud user ID of the user 140 from the header 238, and determines authorization information associated with the cloud user ID of the user 140. For example, the gateway 112 identifies one or more cloud resources 108a, . . . , 108N and/or one or more cloud services offered by the tenancy 104a, which the user 140 is authorized to access. In an example, the gateway 112 may retrieve (e.g., based on the cloud user ID of the user 140) such authorization information from the IAM service 120, and/or from another authorization service maintaining authorization information of users of the tenancy 104a. In yet another example, such authorization information may be determined by the authentication proxy 116 at 295, and included within the header 238. Any appropriate authorization technique may be used.

At 298, the gateway 112 responds to the authentication request 236, and may optionally include a cookie 240. In an example, a session may be established at the device 144 using the cookie 240.

At 299, the device 144 transmits a request to access one or more of the cloud resources 108a, . . . , 108N of the tenancy 104a, and/or one or more services offered by the tenancy 104a. The request may be accompanied by the cookie 240 and/or the token 234.

The gateway 112, upon receiving the request, validates the cookie 240 and/or the token 234, and determines authorization permission of the user 140 and/or the device 144. Accordingly, the gateway 112 grants the device 144 access to one or more cloud resources 108a, . . . , 108N of the tenancy 104a and/or one or more service provided by the tenancy 104a.

FIG. 3 is a flow diagram depicting a method 300 for a multi-level authentication process. At 304 of the method 300, an IAM service (such as the IAM service 120) receives, from a device associated with a user, a first authentication request to authenticate the user for accessing one or more cloud resources through a gateway of a cloud environment. Note that as described above, the device was earlier redirected by an authentication proxy to the IAM service, and the device transmits the first authentication request to the IAM service based on the redirection.

At 308, responsive at least in part to receiving the first authentication request, the IAM service redirects the device to submit a second authentication request to an IdP to authenticate the user for accessing the one or more cloud resources through the gateway.

At 312, the IAM service receives, from the device, a first token indicating a first identity for the user based on a first authentication of the user performed by the IdP. For example, the IdP engages in a first authentication challenge with the device, and issues the first token in response to successfully completing the first authentication of the user.

At 316, the IAM service performs a second authentication of the user. For example, the IAM service engages in a second authentication challenge with the device, in order to successfully complete the second authentication of the user.

At 320, the IAM service issues a second token indicating a second identity for the user. The first and second identities of the user may be the same or may be different, as described above. At 324, the IAM service transmits the second token to the device.

At 328, the device is provided access to the one or more cloud resources, based at least in part on the second token. For example, authorization information associated with the user is determined (e.g., by the authentication proxy 116, the gateway 112, and/or the IAM service 120), based at least in part on the second token. In an example, the authorization information identifies the one or more cloud resources that the user has permission to access. Based at least in part on the authorization information, the device is provided access to the one or more cloud resources.

FIG. 4 is a flow diagram depicting a method 400 through which a device of a user is authenticated by a multi-level authentication process. At 404 of the method 400, a device associated with a user transmits a first access request to access one or more cloud resources through a gateway of a cloud environment.

At 408, the device receives a first redirection to an IAM service to submit a first authentication request to authenticate the user for accessing the one or more cloud resources. For example, the first access request of 404 is to a gateway of a tenancy of a cloud environment, where the tenancy includes the one or more cloud resources, and the first access request of 404 is intercepted by an authentication proxy. The authentication proxy performs the first redirect to the IAM service.

Also at 408, the device submits the first authentication request to the IAM service. In response, the device receives, from the IAM service, a second redirection to an IdP to submit a second authentication request to authenticate the user for accessing the one or more cloud resources.

At 412, the device submits the second authentication request to the IdP, and engages in a first authentication challenge with the IdP. Upon completion of a first authentication performed by the IdP, the device receives, from the IdP, a first token indicating a first identity for the user.

At 416, the device transmits the first token to the IAM service, and engages in a second authentication challenge with the IAM service. Upon completion of a second authentication performed by the IAM service, the device receives, from the IAM service, a second token indicating a second identity for the user. At 420, the device gains access to the one or more cloud resources based at least in part on the second token.

Computer System Architecture

Figure 5:
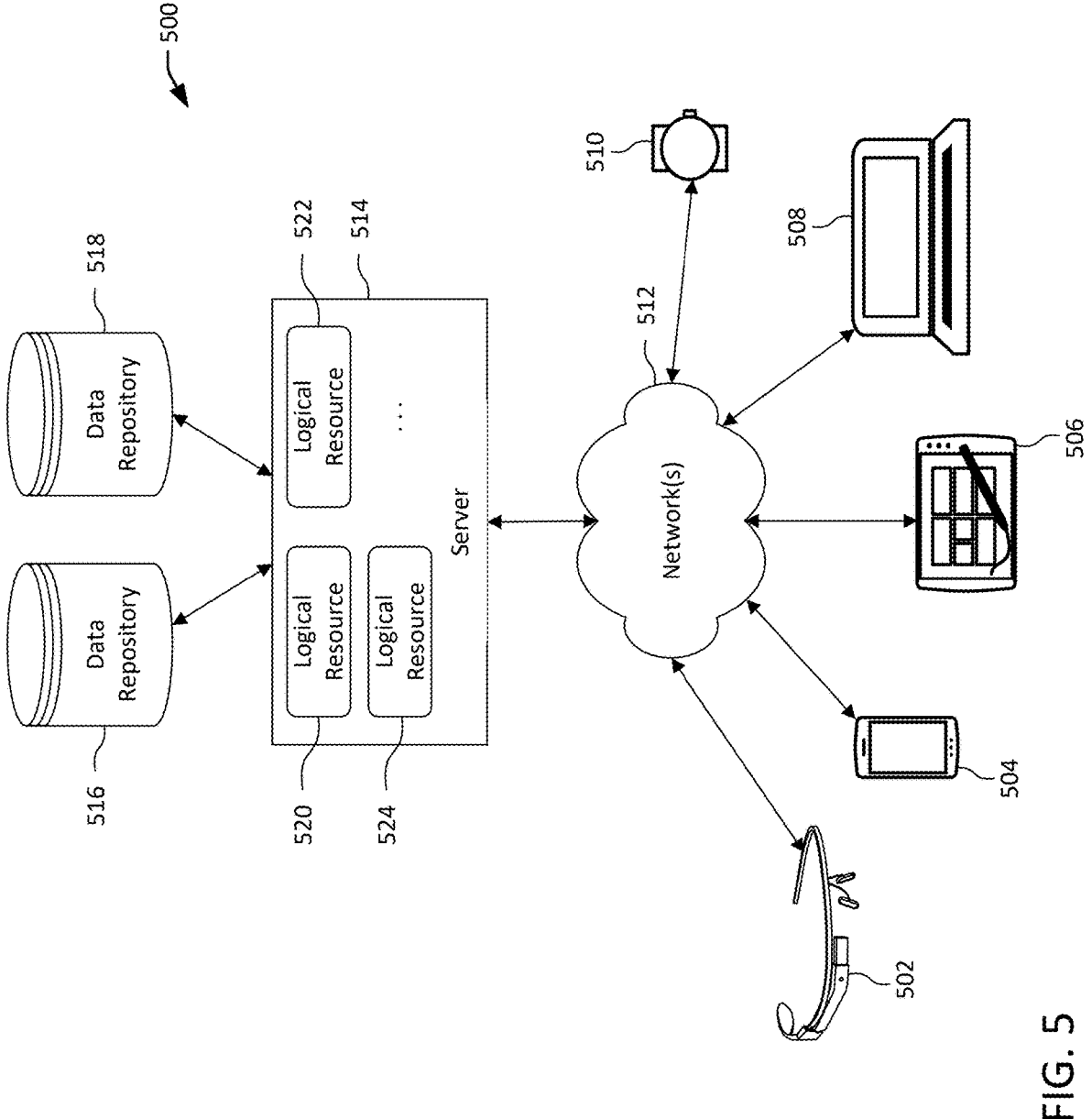
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for a multi-level authentication process.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for a multi-level authentication process in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for a multi-level authentication process. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
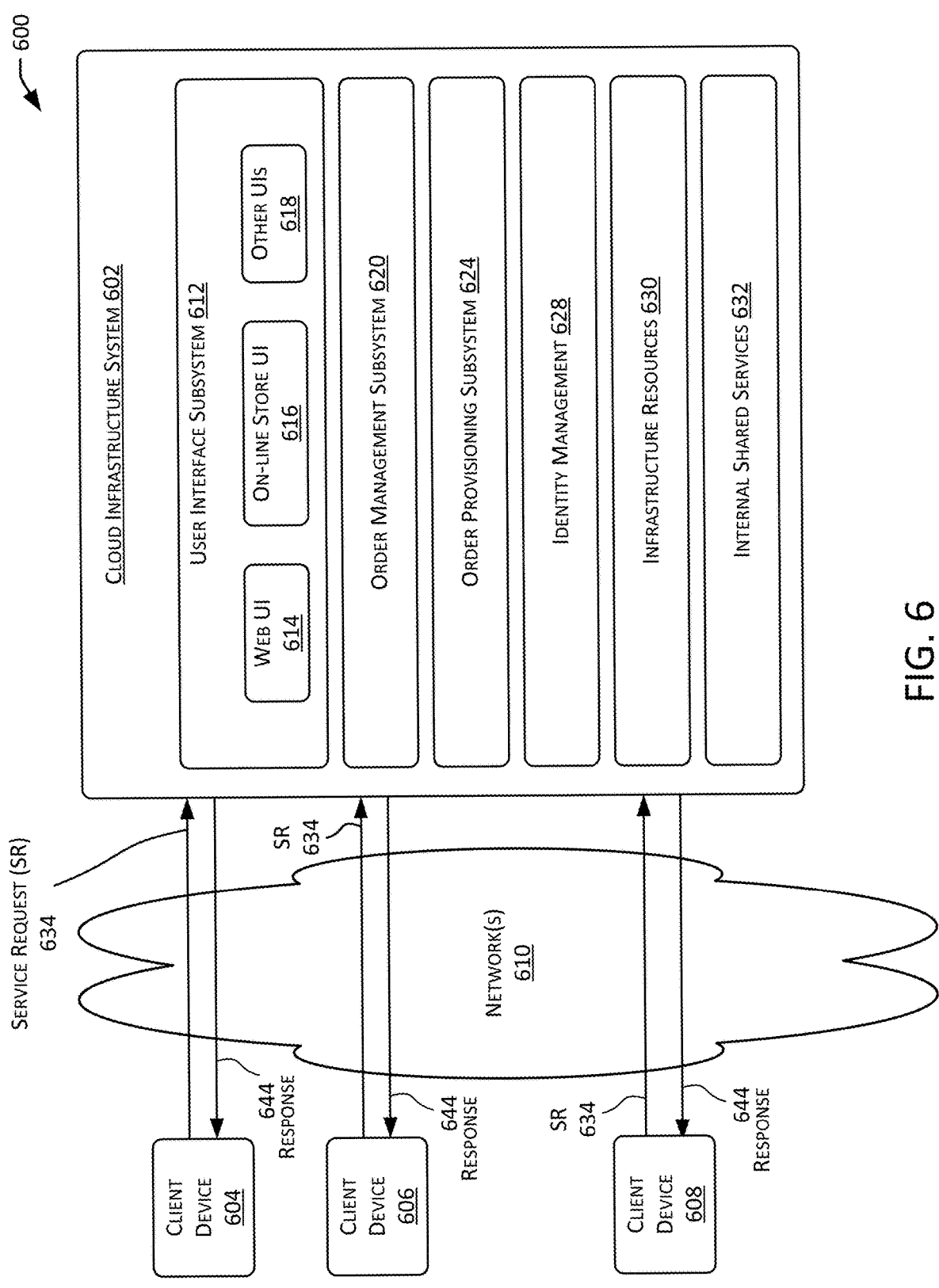
FIG. 6 is a simplified block diagram of one or more components of a system environment by which services provided by one or more components of an embodiment system may be offered as cloud services, in accordance with certain aspects.

FIG. 6 is a simplified block diagram of a cloud-based system environment in which techniques for a multi-level authentication process may be implemented, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider.

Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to pro-vide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to.

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
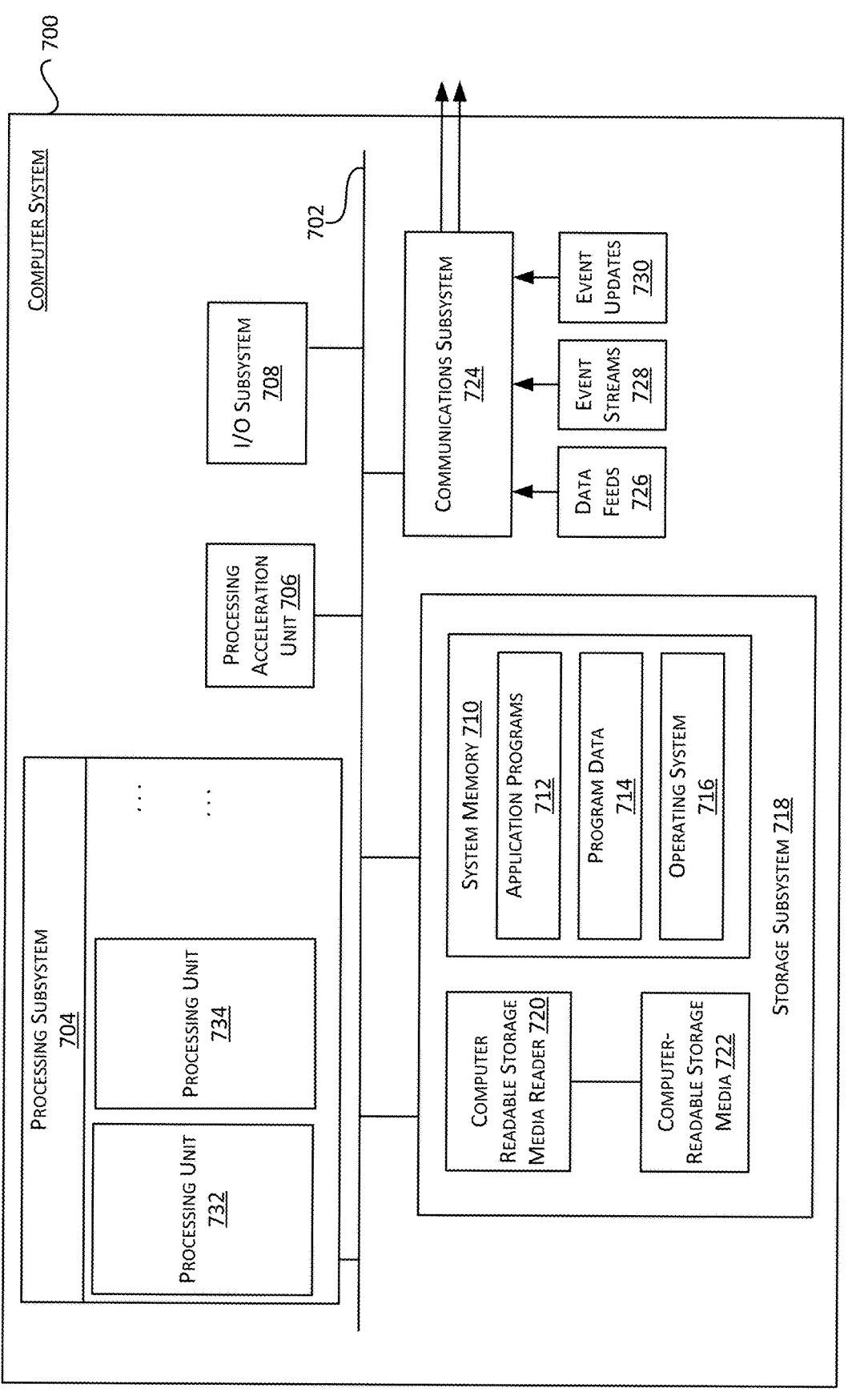
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 722 may store programming and data constructs that provide the functionality of some aspects. Computer-readable media 722 may provide storage of computer-readable instructions, data structures, program modules, and other data for computer system 700.

Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method comprising:

receiving, by an identity and access management (IAM) service from a device associated with a user, a first authentication request to authenticate the user for accessing one or more cloud resources through a gateway of a cloud environment;

responsive at least in part to receiving the first authentication request, redirecting, by the IAM service, the device to submit a second authentication request to an identity provider (IdP) to authenticate the user for accessing the one or more cloud resources through the gateway;

receiving, by the IAM service from the device, a first token that was issued to the device by the IdP, the first token indicating a first identity for the user based on a first authentication of the user performed by the IdP;

performing, by the IAM service, a second authentication of the user;

responsive at least in part to receiving the first token and performing the second authentication of the user, issuing, by the IAM service, a second token indicating a second identity for the user; and transmitting, by the IAM service to the device, the second token, wherein the device gains access to the one or more cloud resources, based at least in part on the second token.

2. The method of claim 1, further comprising:

prior to receiving the first authentication request:

receiving, by an authentication proxy from the device, an access request to access the one or more cloud resources through the gateway; and redirecting, by the authentication proxy, the device to submit the first authentication request to the IAM service.

3. The method of claim 1, wherein the device transmits the first token to the IAM service responsive to being redirected by the IAM service to submit the second authentication request to the IdP.

4. The method of claim 1, wherein the IdP issues the first token responsive to the second authentication request and transmits the first token to the device.

5. The method of claim 1, wherein the first token is issued responsive to the second authentication request and the second token is issued responsive to the first authentication request.

6. The method of claim 1, further comprising:

determining authorization information associated with the user, based at least in part on the second token, the authorization information identifying the one or more cloud resources that the user has permission to access; and providing the device access to the one or more cloud resources, based at least in part on the authorization information.

7. The method of claim 1, wherein the first authentication comprises a first authentication challenge issued to the user by the IdP, and the second authentication comprises a second authentication challenge issued to the user by the IAM service.

8. The method of claim 7, wherein:

the first authentication challenge comprises receiving, from the device, a password;

and the second authentication challenge comprises receiving, from the device, a code.

9. The method of claim 8, wherein the code was issued by the IAM service to the user via the device or another device associated with the user.

10. The method of claim 7, wherein the first authentication challenge comprises receiving, from the device, a password, and wherein the second authentication challenge comprises receiving, from another device associated with the user, a confirmation that the user requests to be authenticated.

11. The method of claim 1, wherein the IAM service executes from within the cloud environment, and the IdP executes from outside the cloud environment.

12. The method of claim 1, wherein:

the one or more cloud resources are within a tenancy rented to a cloud customer;

the IdP is provided by the cloud customer, or by an entity authorized or engaged by the cloud customer; and the IAM service is provided by a provider of the cloud environment.

13. The method of claim 1, wherein:

the user has been provisioned to the IdP; and the IAM service receives, from the IdP, one or more of a user identification (ID) of the user, information about an authenticator application accessible to the user, an email associated with the user, a phone number associated with the user, and a security question and answer pair pre-selected by the user.

14. The method of claim 1, wherein each of the first and second authentication requests is a Security Assertion Markup Language (SAML) request including an Extensible Markup Language (XML) document comprising one or more credentials of the user.

15. The method of claim 1, wherein the first authentication request is received from a web browser or a mobile application being executed on the device.

16. The method of claim 1, wherein the first identity indicated by the first token and the second identity indicated by the second token are for the same user.

17. A method comprising:

transmitting, by a device associated with a user, a first access request to access one or more cloud resources through a gateway of a cloud environment;

receiving, by the device, a first redirection to an identity and access management (IAM) service to submit a first authentication request to authenticate the user for accessing the one or more cloud resources;

submitting the first authentication request to the IAM service;

receiving, by the device from the IAM service, a second redirection to an identity provider (IdP) to submit a second authentication request to authenticate the user for accessing the one or more cloud resources;

submitting, by the device, the second authentication request to the IdP;

receiving, by the device from the IdP, a first token issued by the IdP, the first token indicating a first identity for the user based on a first authentication performed by the IdP;

transmitting, by the device, the first token to the IAM service;

receiving, by the device from the IAM service, a second token indicating a second identity for the user, based on a second authentication performed by the IAM service; and gaining access to the one or more cloud resources based at least in part on the second token.

18. The method of claim 17, wherein the first authentication comprises a first authentication challenge issued to the user by the IdP, and the second authentication comprises a second authentication challenge issued to the user by the IAM service.

19. A non-transitory computer-readable medium including instructions that when executed by one or more processors, cause a computing system that includes the one or more processors to perform operations including:

receiving, by an identity and access management (IAM) service from a device associated with a user, a first authentication request to authenticate the user for accessing one or more cloud resources through a gateway of a cloud environment;

responsive at least in part to receiving the first authentication request, redirecting, by the IAM service, the device to submit a second authentication request to an identity provider (IdP) to authenticate the user for accessing the one or more cloud resources through the gateway;

receiving, by the IAM service from the device, a first token that was issued to the device by the IdP, the first token indicating a first identity for the user based on a first authentication of the user performed by the IdP;

performing, by the IAM service, a second authentication of the user;

responsive at least in part to receiving the first token and performing the second authentication of the user, issuing, by the IAM service, a second token indicating a second identity for the user; and transmitting, by the IAM service to the device, the second token, wherein the device gains access to the one or more cloud resources, based at least in part on the second token.

20. A system for a multi-level authentication within a cloud environment, the system comprising:

one or more processors; and one or more non-transitory computer-readable media storing instructions, which, when executed by the system, cause the system to perform a set of actions including:

receiving, by an identity and access management (IAM) service from a device associated with a user, a first authentication request to authenticate the user for accessing one or more cloud resources through a gateway of a cloud environment;

responsive at least in part to receiving the first authentication request, redirecting, by the IAM service, the device to submit a second authentication request to an identity provider (IdP) to authenticate the user for accessing the one or more cloud resources through the gateway;

receiving, by the IAM service from the device, a first token that was issued to the device by the IdP, the first token indicating a first identity for the user based on a first authentication of the user performed by the IdP;

performing, by the IAM service, a second authentication of the user;

responsive at least in part to receiving the first token and performing the second authentication of the user, issuing, by the IAM service, a second token indicating a second identity for the user; and transmitting, by the IAM service to the device, the second token, wherein the device gains access to the one or more cloud resources, based at least in part on the second token.

* * * * *